Aug. 1, 1950  R. J. HAVENS ET AL  2,516,873
BOLOMETER
Filed Oct. 5, 1945  3 Sheets-Sheet 1

Inventors
RALPH J. HAVENS
HAROLD S. STEWART
By M. D. Hayes
Attorney

Aug. 1, 1950   R. J. HAVENS ET AL   2,516,873
BOLOMETER

Filed Oct. 5, 1945   3 Sheets-Sheet 3

Inventors
RALPH J. HAVENS
HAROLD S. STEWART

By M. O. Hayes
Attorney

Patented Aug. 1, 1950

2,516,873

UNITED STATES PATENT OFFICE 2,516,873

BOLOMETER

Ralph J. Havens, Arlington, Va., and Harold S. Stewart, Washington, D. C.

Application October 5, 1945, Serial No. 620,616

11 Claims. (Cl. 201—63)

(Granted under the act of March 3, 1883, as amended April 30, 1928; 370 O. G. 757)

This invention relates to bolometers, and more particularly to sensitive bolometers having a short time-constant.

All bodies radiate infrared energy and by the use of an appropriate heat sensitive device, such as a bolometer, in conjunction with a suitable optical system, it is possible to detect the presence of a body. In general, two factors limit the effectiveness of infrared detecting devices: one is the lack of sensitivity of the detecting element; and the other is the slowness of the element to respond, that is, the time-constant of the element. Time-constant and sensitivity are interdependent in most detecting devices, and heretofore it has been thought that in order to increase the speed of response, that is, to reduce the time-constant, it is a necessary result that the sensitivity of the system be proportionately reduced. Thus it may be shown that for any given heat-detecting system, an increase in sensitivity is achieved only by a proportional increase in time-constant and conversely that a decrease in time-constant results in a corresponding loss of sensitivity. Where the heat-detecting device is to be employed to detect objects lying at a remote point or objects which are scanned at a high speed, however, it is necessary not only that the detecting element be very sensitive, but also that it respond very rapidly, and thereafter that the detecting element release the energy accumulated equally rapidly to prepare itself to receive later occurring energy.

Essentially a bolometer consists of a strip of thermo-sensitive material suspended between and connected to, two spaced electrodes and preferably blackened to increase its sensitivity. The electrodes are connected to a suitable resistance measuring device whereby a potential as high as practicable is applied across the electrodes. In use the bolometer has associated therewith an optical system whereby radiation from any small area of space being investigated may be concentrated on the bolometer element. Infrared radiation falling on the bolometer strip causes the temperature of the strip to increase, thereby changing the resistance of the strip and proportionately affecting the voltage between the electrodes, the change in voltage being utilized as an indication of the presence of an object.

The heating of the bolometer strip resulting from the radiation falling thereon is dissipated in several ways: (1) reradiation; (2) conduction down the strip to the electrodes; and (3) by conduction and convection to the air. Since the maximum voltage which may be applied across the strip is limited by the maximum temperature to which the bolometer strip may be subjected, in practice maximum theoretical sensitivity is not realized because conduction down the strip to the electrodes leaves the center of the strip hotter than the end portions of the strip and consequently limits the maximum voltage which may be applied without damaging the strip. Heretofore, this limitation on maximum voltage has been regarded as unavoidable and efforts to increase the sensitivity of the bolometer have been directed primarily to avoiding insofar as possible losses due to the heat capacity of the air and conduction down the electrodes. Thus, in the better laboratory bolometers the sensitive element is located in a vacuum and the electrodes are made as small as feasible. Such bolometers, however, have a very large time-constant and are not suitable for detecting objects rapidly.

An object of the present invention is to provide a new and improved bolometer, and more particularly a sensitive bolometer having a short time-constant.

In accordance with one embodiment of this invention, a bolometer may be made comprising a strip of thermosensitive material suspended between two spaced electrodes which may be connected to a suitable resistance-measuring device. A thermal sink is provided comprising a plate of metal separated from the bolometer strip by a layer of electrically insulating material selected to have a heat capacity equal to or less than the heat capacity of the thermosensitive strip, while the heat conductivity per unit-area of the layer is selected to be less than the heat conductivity per unit area of approximately one centimeter thickness of the thermal sink plate.

In accordance with a second embodiment of this invention, a bolometer may be provided comprising a block, or thermal sink, formed in two sections electrically insulated from each other, each section having an electrode associated therewith. A thin layer of electrically insulating material is mounted on one end-face of the block being partially disposed on each of the sections. This layer serves as a support for a bolometer strip and an aperture or gap is formed in the layer to permit heat to be conducted by the gas in the aperture to the thermal sink from the strip. The time-constant of the bolometer is controlled by varying the thickness of the gap between the strip and the sink and by selecting the gas used in the gap to control the rate of heat conduction.

Other objects and advantages of the present invention will be apparent from the following detailed description taken in conjunction with the drawings, wherein.

Figure 1:
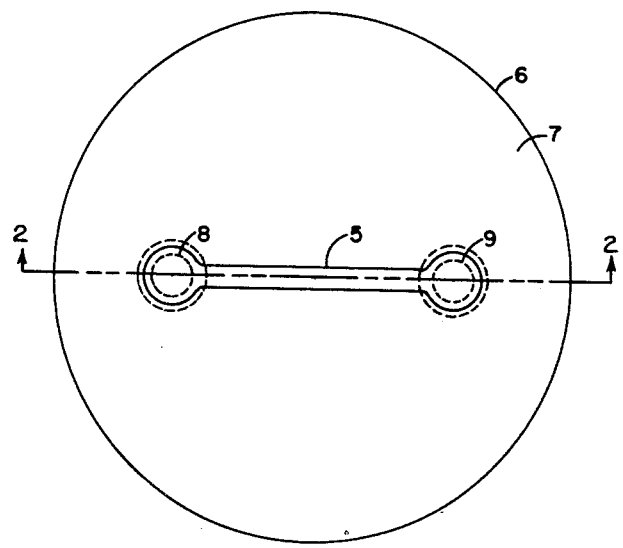
Fig. 1 is a plan view of a bolometer constructed in accordance with the first embodiment of this invention, the bolometer being shown considerably larger than that which would be employed ordinarily to facilitate illustration.

The present invention is intended to provide a bolometer which while maintaining high sensitivity is so designed as to have a small time-constant and thus may be employed to scan a field of view at a rapid rate. Since infrared radiation reaching the bolometer from objects lying at a substantial distance will ordinarily be very weak, a high degree of sensitivity is required. For example, an airplane at night against the sky at a distance of approximately 4000 yards will provide energy at the bolometer on the order of $5 \times 10^{-9}$ watts per square cm.; a man at night at 200 yards against woods, about $5 \times 10^{-7}$ watts per square cm.; and an automobile at 200 yards against a hill, about $5 \times 10^{-8}$ watts per square cm. By employing a suitable optical system, the energy reaching the heat-detecting device may be focused on the device and concentrated resulting in an optical advantage which may increase overall sensitivity as much as 200 times. However, even with this substantial improvement, which has practical limitations related primarily to the size and efficiency of the optical system, the energy available at the heat-detecting device is obviously of a very small value.

At the same time, the time-constant of the bolometer must be small enough to enable it to respond rapidly to briefly occurring energy of low value. This will be more apparent from the following analysis: Assuming a field of view 30° square, then it may be considered that there are 14,400 squares, .25° on a side, in the field of view. Assuming further that each of these elements or squares in the field are inspected by the bolometer every second, and that the bolometer will pass over each element of the field of view in the same length of time, then the time of inspection of a single .25° square element of view is $7 \times 10^{-5}$ seconds and the rate of scan is 3600° per second. The combination of a bolometer and its amplifier will just resolve .25° if the bolometer subtends a .25° square at the focus of a perfect optical system which is scanning at a rate of 3600° per second and if the time-constant of the bolometer-amplifier combination is $7 \times 10^{-5}$ seconds. The time-constant of a system is the time necessary for the output of this system to achieve 63% of the total change resulting from any abrupt change of input.

In order to provide a useful bolometer then, which will detect an object subtending a solid angle of .25° square when the difference in flux from the target as compared with the background is of the order of $5 \times 10^{-9}$ watts per square centimeter, the combination of the optical system, bolometer and amplifier must be able to detect a signal difference incident on the bolometer of about $10^{-6}$ watts and the time-constant of the combination should be about $3 \times 10^{-5}$ seconds. While these figures are merely illustrative, it will be apparent from them that a very high order of sensitivity is required in combination with a very short time-constant to provide a useful scanning system. Heretofore, however, as aforesaid, it has been thought that any attempt to decrease the time-constant of a system would result in a corresponding sacrifice of sensitivity. However, in accordance with the present invention a bolometer is provided having both a high degree of sensitivity and a short time-constant enabling rapid scanning and detection of remote objects radiating low values of infrared energy.

Figure 2:
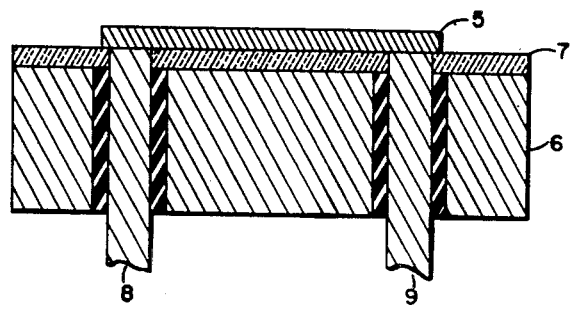
Fig. 2 is a vertical, sectional view taken substantially along the line 2—2 of Fig. 1.

Referring now to the drawings, and particularly to Figs. 1 and 2 thereof, it will be seen that a bolometer constructed in accordance with the first embodiment of this invention comprises a narrow, thin metal strip of a thermosensitive material, such as silver or gold, which is fixed to a relatively heavy metal backing plate 6, or thermal sink, by a thin layer of adhesive material 7. The layer 7 is selected to have both electrical insulating properties as well as desired heat-conducting properties. Electrodes 8 and 9 are mounted in the plate and suitably electrically insulated therefrom, and are attached respectively to either end of the strip 5. In using this bolometer, the electrodes may be connected to a suitable resistance-measuring circuit.

In practice the backing plate 6, forming the thermal sink, is made of brass, or other suitable material having high heat conductivity and a heat capacity relatively to the heat capacity of the strip 5 and insulating layer 7 as large as feasible. Thus, the thickness of the strip 5 may be on the order of .1 micron and the thickness of the insulating layer 7 on the order of seven microns, while the thickness of the backing plate may be as much as half an inch more. In this manner, the heat capacity of the backing plate 6 with respect to the metal strip 5 and insulating layer 7 is made substantially infinite. Since the heat acquired by the strip 5 will be lost to the backing plate 6 at a rate determined by the heat conductivity of the insulating layer 7, the thickness of the insulating layer 7 and the material of which it is made must be selected with regard to the desired heat conductivity. It has been found that the most desirable condition is that where the product of the thermo-conductivity and the specific heat of the insulating layer 7 will have a minimum value and that this may be achieved in practice by employing a layer composed of small bubbles of air in a medium of low specific heat, such as rubber cement. Such a layer may be provided by placing fibers of a material such as glass having the required diameter to provide the necessary thickness in the insulating layer on one side of the metal plate 6. The plate and fibers are then coated with a dilute adhesive material, such as rubber cement, and a weight is applied to the coated surface of the metal plate so that the adhesive material will be uniformly distributed over the surface of the plate 6. Heat is then applied to the plate to cause air bubbles to form. After the adhesive material has been suitably cured, as described, the strip 5 may be placed on the insulating layer 7 and suitably secured thereto and the terminals 8 and 9 respectively attached to either end of the strip, as by soldering.

Because of the metal backing plate 6, the heat loss from the bolometer strip 5 will be substantially uniform throughout its length and thus hot spots are avoided enabling the use of a higher potential than heretofore possible without damage to the strip. This results in greatly improved overall sensitivity.

Furthermore, by a proper selection of the thickness of the insulating layer and the material of which the insulating layer is formed, a considerable range of thermal conductivity may be obtained whereby the time-constant may be closely controlled. In practice, the conductivity of the layer 7 is selected to be such that losses due to convection to the air are so small compared to the loss to the thermal sink, that they may be disregarded. Thus, a bolometer is provided having increased sensitivity and at the same time a reduced time-constant as compared to bolometers heretofore available.

Figure 3:
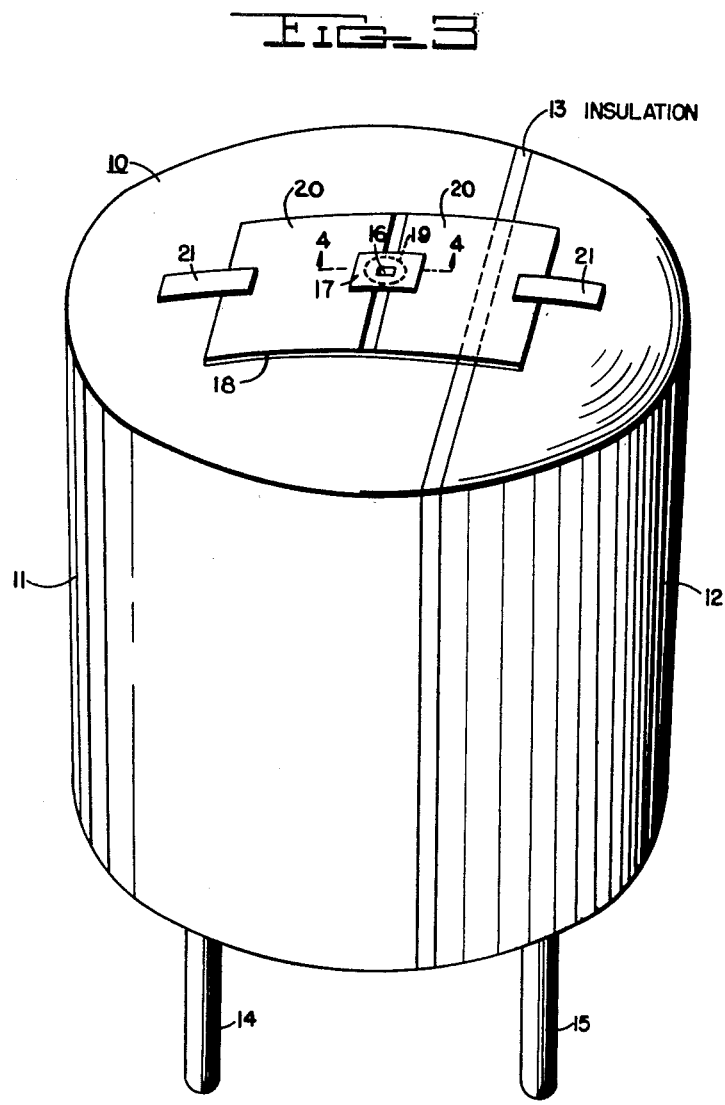
Fig. 3 is a similarly enlarged perspective view of a bolometer constructed in accordance with a second embodiment of this invention.
Figure 4:
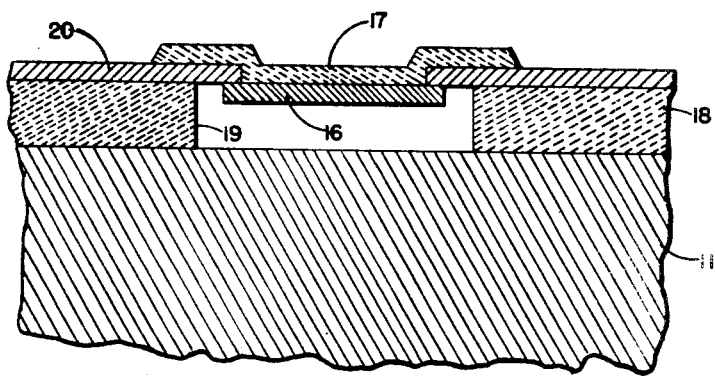
Fig. 4 is an enlarged vertical, sectional view taken substantially along the line 4—4 of Fig. 3.

In accordance with a second embodiment of this invention, a bolometer may be provided in which control of the conductivity of the insulating layer is somewhat simpler to achieve than in accordance with the first embodiment of the invention. Referring now to Figs. 3 and 4 of the drawings, it will be seen that a cylindrical block 10, which serves as a thermal sink, is there shown formed in two sections 11 and 12 of unequal size. The sections are joined by a layer 13 of an electrically insulating adhesive material. The block 10 is preferably made of a material such as brass having a high heat capacity and heat conductivity. Electrodes 14 and 15 are attached respectively to the lower ends as viewed in Fig. 3 of the sections 11 and 12. A bolometer strip 16, of silver or gold or other suitable material, which may be supported by a film 17 of ceramic material such as quartz or silica, is mounted on the upper side of the block 10, as viewed in Fig. 3, on a plate or sheet 18 of an electrically insulating material, such as mica, the strip 16 being located transversely across an aperture 19 formed in the sheet 18 of a diameter slightly greater than the length of the bolometer strip. The ends of the bolometer strip are connected to the exposed surfaces of the thermal sink sections 11 and 12 respectively by spaced films 20 of electrically conductive material which are provided over the upper surface of the mica sheet 18 and to the outer edges of which are attached foils 21 of electrically conductive material. The foils 21 extend beyond the edges of the sheet 18, as shown in Fig. 3, and are fixed to the sections 11 and 12. It will be understood that this method of connecting the ends of the strip 16 to the electrodes 14 and 15 is merely illustrative and that any suitable method may be employed.

While the bolometer element described in accordance with the second embodiment of this invention may be formed in any suitable manner, a method of making such a bolometer has been devised in accordance with the present invention which provides a high degree of accuracy and facility. The thermal sink 10, which as aforesaid is made in two sections, may be bonded together by a glass cloth spacer impregnated with nylon cement, or any suitable adhesive material providing at the same time a high degree of electrical insulation. The plane dividing the two sections of the thermal sink is parallel to the axis of the cylinder and is offset from the axis of the cylinder sufficiently so that the aperture 19 formed in the plate 18 will be disposed over the surface of the larger section only. The upper end of the cylinder 10 is curved slightly to prevent the plate 17 from bowing away from the base and to put the ceramic film 17 under a slight tension. This is accomplished by curving this end of the cylinder so that its surface is a section of a cylinder of about 2 inches radius, the axis of which is parallel to the plane dividing the two sections and passes through the axis of the base.

In preparing the sheet 18, mica or other suitable electrically insulating material is split to the required thickness, which is on the order of 15 to 50 microns, depending on the time-constant required, and the aperture 19 formed in the sheet. Thereafter, a thin film which provides a temporary support for the bolometer strip is formed by a suitable film forming method and placed on the sheet 18. For example, guncotton (viscosity: approximately 29 seconds) may be dissolved in amyl acetate, in the proportions of approximately 8 grams and 80 ccs. respectively and a drop allowed to fall on a clean water surface. After the amyl acetate has partially vaporized, the film of guncotton is picked up on a wire ring. The film is stretched as tight as possible and then baked for approximately 1 hour at about 120° C. to remove any residual amyl acetate and to shrink the film. The thickness of the film may be estimated by the interference colors observed when two or three pieces of the film are stacked together and a final thickness on the order of 0.1 micron is suitable. The mica plate is then moistened and laid on the guncotton film. Thereafter the film and sheet of mica are baked for approximately 20 minutes at 120° C. to reduce any strain in the film and provide a smooth surface.

The preparation of the bolometer strip 16, which may be made of silver, gold, bismuth or bismuth alloys or other suitable metals such as aluminum, copper, iron, tin, or silicon germanium alloys, is accomplished by depositing a quantity of the metal on the surface of the guncotton film. Any suitable metal-depositing method such as evaporation whereby a strip having a thickness of about .03 micron may be formed may be employed. In order to restrict the area in which the strip 16 is deposited, a suitable mask may be employed. At this point the electrically conductive films 20 may be formed on the mica sheet and strip 16. A simple method of accomplishing this is to evaporate silver or other suitable metal over the mica sheet 18 and the ends of the strip 16, a suitable mask being employed to prevent the silver from being deposited on the strip except at the extreme ends thereof. In general, a silver film having a thickness of approximately one micron is satisfactory.

Quartz or silica then is evaporated over the bolometer strip to form the film 17; for example, Sontocel, supplied by the Monsanto Chemical Company of St. Louis, Missouri, may be used. After the quartz has been evaporated onto the bolometer strip, the gun-cotton film is removed by baking the assembly at a temperature on the order of 200° C., the quartz or silica film serving as a support for the bolometer strip. While it is not essential to employ the quartz or silica film to support the strip, where the conducting film has sufficient strength, it is desirable, in general, since the quartz film also serves to separate the bolometer metal from the blackening agent, which is used to increase sensitivity, thereby eliminating the danger of electrical noise being caused in the bolometer by the blackening agent.

In the next step the mica plate and associated elements are fixed to the upper surface of the thermal sink 10 as viewed in Fig. 3 by using any suitable cementing agent. The foils 21 are then connected to the silver film by soldering or other suitable methods, and the complete bolometer may then be placed under a bell jar where the black is formed on the exposed surface of the bolometer strip as by evaporating gold in a hydrogen atmosphere at a pressure of 15 to 50 millimeters of mercury. Evaporation is stopped when the bolometer surface appears to reflect about 10 per cent of the incident light. It will be understood that other blackening agents than gold may be employed without departing from the present invention.

In order to make the bolometer have a short time-constant, it is not only necessary to have the specific heat of the bolometer strip, its black and its support, reduced to a minimum, but it is also necessary to have the conductivity of heat from the bolometer large. On the other hand, in order to make the bolometer sensitive, all of the material involved in the conduction of the heat from the bolometer to places of approximately room temperature must have a total specific heat as small as possible. In the case of the bolometer described in accordance with the second embodiment of this invention, the conductivity of heat away from the bolometer to the thermal sink is so much greater than the conduction in other ways that this is the only conduction that need be considered. Thus, by adjusting the thickness of the mica plate 18 and the material in the aperture 19, that is, the gas, the conduction of heat from the bolometer strip to the thermal sink may be controlled within relatively close limits. It will be readily apparent that the thickness of the mica sheet may be readily controlled. The gas in the area of the aperture is controlled by locating the bolometer in use in a hermetically sealed chamber which is filled with a gas having the desired heat conductivity, such as hydrogen, the heat conductivity of which is approximately six times that of air.

Since the bolometer strip 16 is located in a plane parallel to the plane of the thermal sink surface, the heat loss is uniform throughout its length and a hot spot in the center of the strip is avoided thus permitting the use of higher potentials across the strip and resulting in greatly improved sensitivity.

The total heat capacity of the bolometer is proportional to the area of the bolometer; thus the minimum detectable signal is proportional to the square root of the area of the bolometer. If the area remains constant, the minimum detectable signal is independent of the ratio of the length of the bolometer to its width. For the bolometers described here the minimum detectable signal is inversely proportional to the specific temperature coefficient of resistance of the bolometer strip, and it is independent of the resistance of the bolometer strip. The specific temperature coefficient of resistance of the metals used in the bolometer strips is a function of the temperature of operation. The minimum detectable signal is inversely proportional to the time-constant for which the bolometer-amplifier combination is designed. If the bolometer and the amplifier cannot be designed to match the duration of the pulses to be detected, the minimum detectable signal will be larger than it would be if the match could be made. Thus for a particular case, maximum sensitivity is obtained from a bolometer when its time-constant is made equal to the duration of the pulse of radiation to be detected by the bolometer, or made equal to the resolution, expressed on a time basis, of the scanning system in which the bolometer is used. A high degree of efficiency is attained with the present bolometer since the time-constant may be varied readily by changing the gas in the aperture 19 or the pressure of the gas, even during use. Of course, as a matter of practice it is desirable that the bolometer be so constructed as to have a time-constant suitable for the type of signals to be detected since the major adjustment of time-constant is effected by varying the thickness of the insulating sheet 18.

While but two embodiments of this invention have been shown and described, it will be understood that many changes and modifications may be made therein without departing from the spirit or scope of the present invention.

The invention shown and described herein may be manufactured and used by or for the Government of the United States of America for governmental purposes without the payment of any royalties thereon or therefor.

What is claimed is:

1. In a heat-detecting device, a strip of thermosensitive material, a thermal sink, and an electrically insulating layer situated between said strip and said sink and supporting said strip on said sink.

2. In a heat-detecting device, a strip of thermosensitive material, a thermal sink and an electrically insulating layer situated between said strip and said sink and supporting said strip on said sink, the thickness of said layer and the material of which said layer is formed being selected to control the rate of heat conduction from said strip to said sink.

3. In a heat-detecting device, a strip of thermosensitive material, a thermal sink, means situated between said strip and said sink for supporting said strip on said sink and for controlling the rate of heat conduction from said strip to said sink.

4. In a heat-detecting device, a strip of thermosensitive material, a thermal sink, means situated between said strip and said sink for supporting said strip on said sink and for controlling the rate of heat conduction from said strip to said sink, said sink having a substantially infinite heat capacity with respect to the heat capacity of said strip and said strip-supporting means.

5. In a heat-detecting device, a strip of thermosensitive material, a thermal sink, and electrically insulating, heat transmitting means for controlling the rate of heat conduction between said strip and said sink.

6. In a heat-detecting device, a strip of thermosensitive material, a thermal sink, a layer of insulating material located between said strip and said sink, said layer having an aperture formed therein, a gas in said aperture to permit heat to be conducted from said strip to said sink, the rate of heat conduction from said strip to said sink being determined by the thickness of said layer and the heat-conductivity of the gas in said aperture.

7. In a heat-detecting device, a strip of thermosensitive material, a thermal sink, a layer of electrically insulating material situated between said strip and said sink and supporting said strip on said sink out of electric contact with the latter, said sink having a substantially infinite heat capacity with respect to the heat capacity of said strip and said layer, said layer having an aperture formed therein beneath said strip, a gas in said aperture to permit heat to be conducted from said strip to said sink, the rate of heat conduction being determined by the thickness of said layer and the heat conductivity of the gas in said aperture.

8. In a heat-detecting device, a strip of thermosensitive material, a thermal sink, a layer of electrically insulating material mechanically and electrically separating said strip from said sink, said layer having a heat capacity equal to or less than the heat capacity of the thermosensitive strip and a heat conductivity per unit area of the layer less than the heat conductivity per unit area of approximately one centimeter of the thermal sink.

9. In a heat-detecting device, a thermal sink formed in two sections electrically insulated from each other, a layer of electrically insulating material disposed across an end of said sink and supported on both sections, said layer having an aperture formed therethrough, a strip of thermosensitive material, and a film for supporting this strip transversely across said aperture, the rate of heat conduction from said strip to said sink being determined primarily by the thickness of said layer.

10. In a heat-detecting device, a thermal sink formed in two sections of unequal size and electrically insulated from each other, a layer of electrically insulating materials disposed across an end of said sink and supported on both sections, said layer having an aperture formed therethrough and located over the larger of said sections, a strip of thermosensitive material, and a film for supporting said strip transversely across said aperture, the rate of heat conduction from said strip to said sink being determined primarily by the thickness of said layer.

11. In a heat-detecting device, a thermal sink formed in two sections of an equal size and electrically insulated from each other, a layer of electrically insulating materials disposed across an end of said sink and supported on both sections, said layer having an aperture formed therethrough and located over the larger of said section, a strip of thermosensitive material, and a film for supporting said strip transversely across said aperture, the rate of heat conduction from said strip to said sink being determined primarily by the thickness of said layer, said sink having a heat capacity substantially infinite with respect to the heat capacity of said strip and said layer.

RALPH J. HAVENS.
HAROLD S. STEWART.

REFERENCES CITED

The following references are of record in the file of this patent:

UNITED STATES PATENTS

| Number | Name | Date |
|---|---|---|
| 2,171,531 | Basley | Sept. 5, 1939 |
| 2,196,830 | Hewlett | Apr. 9, 1940 |

FOREIGN PATENTS

| Number | Country | Date |
|---|---|---|
| 3,249 | Great Britain | Feb. 13, 1884 |
| 314,838 | Great Britain | July 3, 1929 |